United States Patent [19]

Davie

[11] Patent Number: 4,847,824
[45] Date of Patent: Jul. 11, 1989

[54] READBACK CIRCUITS FOR MAGNETOOPTIC PLAYERS

[75] Inventor: Neil R. Davie, Tucson, Ariz.

[73] Assignee: International Business Machines Corporation, Armonk, N.Y.

[21] Appl. No.: 135,797

[22] Filed: Dec. 21, 1987

[51] Int. Cl.⁴ .............. G11B 7/095; G11B 13/04; G11B 11/00

[52] U.S. Cl. .................... 369/124; 369/13; 369/110

[58] Field of Search ............ 369/13, 124, 59, 110

[56] References Cited

U.S. PATENT DOCUMENTS

| | | | |
|---|---|---|---|
| 4,488,277 | 12/1984 | McFarlane et al. | 369/124 |
| 4,561,082 | 12/1985 | Gerard et al. | 369/124 |
| 4,688,204 | 8/1987 | Moyes et al. | 369/124 |
| 4,785,438 | 11/1988 | Mizunoe | 369/110 |
| 4,797,872 | 1/1989 | Rokutan | 369/59 |

*Primary Examiner*—Steven L. Stephan
*Attorney, Agent, or Firm*—H. F. Somermeyer

[57] ABSTRACT

A magneto-optical player employs a differential readback circuit. The differential signal output of the readback circuit is low pass filtered. The filtered signal is converted to a single-ended signal and applied to a field effect transistor (FET). The FET is connected between one of the differential inputs of the readback circuit and a reference potential. The single-ended signal controls the FET to variably attenuate one side of the differential signal for reducing noise induced into the readback signal from diverse sources.

4 Claims, 1 Drawing Sheet

U.S. Patent
Jul. 11, 1989
4,847,824
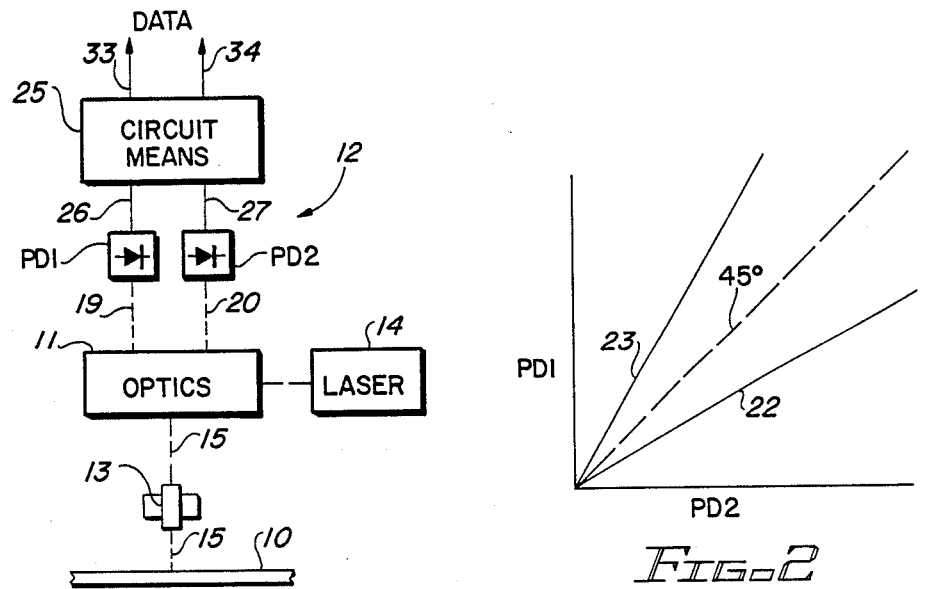
Fig.-1
Fig.-2
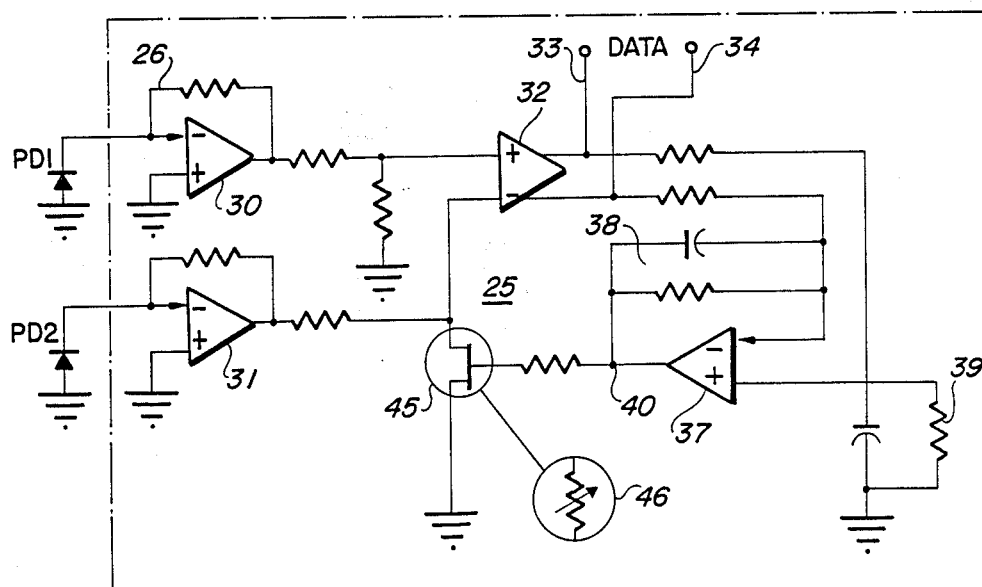
Fig.-3

READBACK CIRCUITS FOR MAGNETOOPTIC PLAYERS

FIELD OF THE INVENTION

This invention relates to magnetooptic readers or players, more particularly to electrical circuits of the differential type used to read signals from magnetooptic media.

BACKGROUND OF THE INVENTION

In optically sensing information bearing signals recorded in magnetooptic media, two optical detectors are employed. The signals from the two detectors are differentially processed to indicate the recorded information. Optically, the readback from a magnetooptic medium is represented by rotation of the light polarization in the light reflected from the magnetooptic record medium. Using two optical detectors enables an improved detection method; hence the differential electrical signal processing circuits. A problem does arise in such differential processing. Noise in the reflected light beam results from intensity modulation of the light. Such intensity modulation can occur by variations in read beam light intensity caused by unintended changes in read laser operation. Further intensity modulation can occur by unintended magnetooptic medium reflectivity changes, misalignment of optical elements (intensity reduction and the like). Any cause of the intensity modulation of the reflected light beam results in broadband noise in the electrical readback signal. Such reduction in signal-to-noise ratio tends to limit performance of magnetooptic recorders and readers.

Cancellation of the intensity modulation effects on the readback circuits because of misalignment of polarizing optical elements of the readback system and lack of equal amplitudes in intensity modulation induced noise at the two detectors used in the magnetooptic readback system result in incomplete cancellation of common mode noise in the differential amplifier. Therefore, common mode rejection of the noise is not always completely effective. It is desired to automatically and continuously remove intensity modulation induced noise from a magnetooptic readback signal. Such removal is directed at the asymmetrical difference in the amplitudes of such noise at the two magnetooptic detectors.

DOCUMENTS INCORPORATED BY REFERENCE

U.S. Pat. No 4,206,416 shows a high performance wideband differential amplifier having a noise reduction circuit applying a difference indicating signal to one side of an output differential amplifier stage. This circuit arrangement is to remove the common mode signal component; it appears that it would be inoperative to remove noise effects caused by intensity modulation induced noise having asymmetrical amplitudes on the two input terminals of a differential amplifier.

U.S. Pat. Nos. 3,908,173 and 3,353,111 show variations of feedback from an output portion to an input portion of a differential amplifier which include a filter in the feedback circuit. The feedback is asymmetrical to an in-phase and out-of-phase channel., The patent 3,908,173 shows a single-ended output—which is not desired. U.S. Pat. No. 3,353,111 shows feedback to both differential inputs—which is also not desired.

SUMMARY OF THE INVENTION

It is an object of the present invention to provide an enhanced circuit and system for magnetooptic readers or players that enable the readback circuits to accommodate intensity modulation induced noise.

A system employing the present invention includes a pair of photo detectors electrically coupled to two inputs of a differential circuit. The output of the differential circuit is also differential. That differential output is supplied through a differential feedback circuit to a field effect transistor (FET). The feedback circuit is arranged to supply a single ended control to the control electrode of the FET. The signal electrodes of the FET are connected between a reference potential and one input of the differential readback circuit. As such, the FET electrically appears as a variable resistance which varies in a manner to accommodate and cancel noise caused by intensity modulation of the reflected light beam and resulting electrical noise signals in the electrical portion of the readback system.

The foregoing and other objects, features, and advantages of the invention will be apparent from the following more particular description of preferred embodiments of the invention, as illustrated in the accompanying drawings.

DESCRIPTION OF THE DRAWING

FIG. 1 is a simplified diagram showing a magnetooptic reader or player.

FIG. 2 is a graph illustrating light polarization of a reflected light beam.

FIG. 3 is a circuit diagram of a circuit usable in the FIG. 1-illustrated reader.

DETAILED DESCRIPTION OF A PREFERRED EMBODIMENT

Referring now to the drawing, like numbers indicate like parts and structural features in the various figures. A magnetooptic record disk 10 is in optical communication with the optical portion 11 of a reader 12 via objective lens 13. Construction of optics 11 is in accordance with known magnetooptic readers which employ differential signal detection circuits. Laser 14 supplies a read light beam through optics 11 to disk 10. The read beam is reflected over the light path indicated by dashed line 15 to optics 11. Optics 11 separates the reflected light beam into two light beams, one passing through light polarizers (not shown but located in optics 11) for passing light having a clockwise rotated linear polarization measured from a reference linear polarization angle while the other light beam passes through light polarizers (located in optics 11) passing light rotated counter clockwise from the reference rotation. Optics 11 transmit the two light beams respectively over paths 19 and 20 to photodiode detectors PD1 and PD2. When a binary one is being read from disk 10, optics 11 reduces light from PD2 and increases light to PD1; when a binary zero is being read from disk 10, optics 11 reduces light from PD1 and increases light to PD2. It is easily seen that the relative output signal amplitudes of PD1 and PD2 represent the stored signals of disk 10. FIG. 2 illustrates the linear light polarization rotation. The dashed line at 45 degrees to the abcissa represents the reference rotation. For a binary one the linear polarization of the reflected light beam is rotated to line 23 while for a binary zero the linear polarization is rotated to line 22.

PD1 and PD2 respectively supply their output electrical signals to circuit means 25 over lines 26 and 27. Circuit means 25 includes the input transimpedance amplifiers 30 and 31 for respectively amplifying the PD1 and PD2 supplied signals. Circuit isolation is also provided by amplifiers 30, 31. Differential amplifier 32 differentially receives the amplifier 30,31 outputs to supply a data indicating differential signal over lines 33, 34. Differential feedback amplifier 37 differentially receives the data indicating signals from lines 33, 34. The signals are low pass filtered by RC networks 38, 39, respectively. The single ended output signal on line 40 from feedback amplifier 37 travels to the control electrode of FET 45. The signal electrodes of FET 45 respectively are connected to a ground reference potential and to one input of differential amplifier 32. FET 45 acts as a variable resistor as indicated by symbol 46. The resistance value of FET 45 is determined by the low frequency components of the readback signal to attenuate one input of amplifier 32. Using known empirical techniques, the illustrated circuit is adjustable to negate the effects of optics 11 misalignments, thermal drift effects, variations in PD1 and PD2 characteristics, and effects of variations of disk 10 birefringence (i.e. optical variations in a transparent coating of disk 10). As a result, unintended polarization rotation effects from diverse sources which add noise to the polarization rotation caused by reading disk 10 are cancelled yielding a higher signal to noise ratio in the readback electrical signal.

While the invention has been particularly shown and described with reference to its preferred embodiments thereof, it will be understood by those skilled in the art that various changes in form and details may be made therein without departing from the spirit and scope of the invention.

What is claimed is:

1. In a magnetooptic player having readback circuits with a signal processing differential circuit having first and second differential input connections and first and second differential output connections, first and second photo detectors respectively electrically coupled to said first and second input connections, a reference potential means in the readback circuits, the improvement including, in combination:

an FET having two signal electrodes and a control electrode, one of the signal electrodes being connected to said first input connection and a second one of the signal electrodes being connected to said reference potential means;

a feedback differential amplifier having third and fourth input connections and a single ended output connection, said single ended output connection being electrically coupled to said control electrode, said third input connection being electrically connected to said first output connection and said fourth input connection being electrically connected to said second output connection; and low pass filter means in said feedback differential amplifier.

2. In the invention set forth in claim 1, further wherein said low pass filter means comprises first and second resistance-capacitance (RC) networks respectively coupled to said third and fourth input connections.

3. In the invention set forth in claim 2, wherein said first RC network being connected between one of said third and fourth input connections and said reference potential means and said second RC network being connected between a second one of said third and fourth input connections and said single ended output connection.

4. In the invention set forth in claim 1, further including, in combination:

first and second transimpedance amplifiers respectively electrically interposed between said first and second photo detectors and said first and second input connections.

* * * * *